May 4, 1943. M. F. THORN 2,318,543
PISTON RING
Filed Jan. 8, 1941
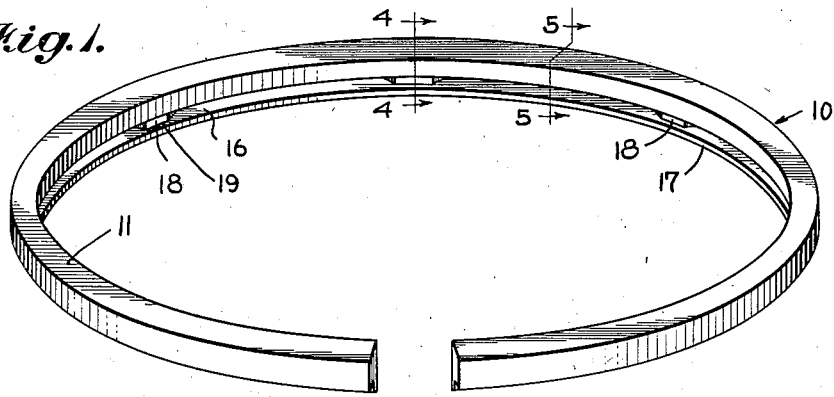
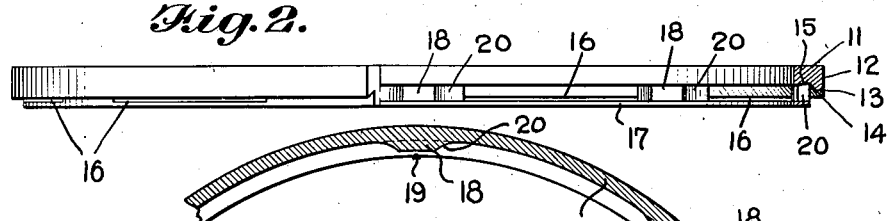
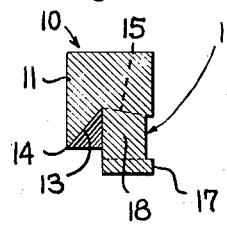
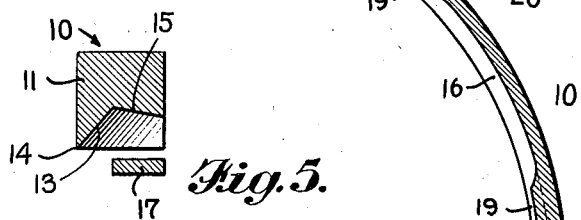
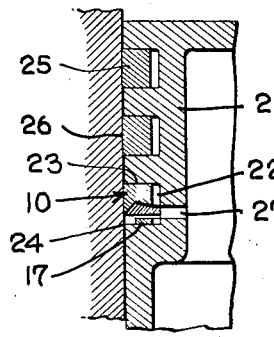

Patented May 4, 1943

2,318,543

UNITED STATES PATENT OFFICE 2,318,543

PISTON RING

Millard F. Thorn, Beaumont, Tex.

Application January 8, 1941, Serial No. 373,671

2 Claims. (Cl. 309—45)

This invention relates to piston rings, and particularly to oil rings of the type having an undercut portion providing a scraping or shearing edge which on the down stroke of the piston engages the wall of the cylinder and cleaves, scrapes or shears excess oil therefrom and directs it through one or more ports in the piston to the interior of the latter.

An object of the present invention is to provide an oil ring for pistons of the undercut edge type which operates with maximum efficiency and which at the same time will withstand the stresses to which it is subjected over a long period of use.

A more specific object of the invention is to provide an oil ring operating to scrape or shear excess oil from the walls of the cylinder on the down stroke of the piston to avoid formation of carbon deposits in the combustion chamber and which at the same time automatically creates an even application of pressure on all points circumferential of the ring and piston.

Another object is to provide an oil ring for pistons of the undercut edge type which is so constructed that upon the down stroke of the piston the oil will exert a pressure on the ring having two components, one acting to spread the ring outwardly against the cylinder wall and the other urging the ring against the upper ring land to effect maximum flushing of the cylinder wall and at the same time avoid leakage of oil around the ring back into the cylinder.

A further object is to provide an oil ring of the slotted undercut edge type having a base which will impart maximum strength to the ring and also avoid wear on the ring land and facilitate replacement jobs.

The foregoing and other objects and advantages of the improved piston ring will be rendered apparent in view of the following description taken in conjunction with the drawing, wherein:

Fig. 1 is a view in perspective of a piston ring embodying the features of the invention;

Fig. 2 is a view in sectional elevation of Fig. 1;

Fig. 3 is a horizontal section;

Figs. 4 and 5 are enlarged sectional views taken on the lines 4—4, 5—5, Fig. 1; and Fig. 6 is a fragmentary sectional view of a piston and adjacent cylinder wall with the improved ring installed on the piston.

Referring to the drawing in detail, a piston ring is generally indicated at 10 having a main body portion or ring proper 11 of cast iron, cast steel, or other suitable material. The upper peripheral edge 12 of the ring is preferably rounded while the lower portion of the ring is undercut or beveled as at 13, providing a scraping or shearing edge 14.

From the peak of the inside bevel 13 inwardly to the inner or inside surface of the ring, the latter is preferably formed with a bevel or downwardly inclined wall 15, to thereby provide a pocket which when the piston is on the down stroke, causes the oil to exert an upward thrust on the ring and more effectively seal the joint between the ring and the adjacent surface of the ring land. This is important due to the fact that there is a tendency for the oil to leak past the ring on the down stroke of the piston back to the cylinder and thereby defeat the purpose for which the ring was devised.

The groove on the outside lower edge of the ring which provides the undercut or scraping edge 14 and beveled surface 13 may be approximately $\frac{1}{32}$ of an inch deep, with the surface lying at an angle of approximately 45° or less, the depth and angle being variable depending upon conditions.

The ring is formed with a series of slots 16 which, as shown, are horizontal from the inside face of the ring to the inside of the wall 15. However these slots or holes may be inclined downwardly slightly as they approach the inside face of the ring. These slots or holes are preferably placed at regular intervals completely around the circumference of the ring.

The portions 18 of metal between the slots 16 which join the base 17 of the ring with the main body portion 11 are each formed with a circumferential groove 19, which may be appropriately termed equalizing grooves or channels in that they serve to equalize and distribute the oil throughout the circumferential area of the ring and piston on the down stroke of the latter. Thus, when the piston starts its down stroke, the scraping edge 14 engages and directs the excess oil inwardly through the slots 16, and should there be any uneven distribution of oil on the cylinder wall (which is generally the case), the oil will flow circumferentially of the ring through the grooves or channels 19 and equalize the pressure on the ring and piston.

The portions 18 which join the base 17 with the body 11 of the ring are each formed with sloping beveled faces 20 to impose a minimum of resistance to circumferential flow of the oil.

Fig. 6 shows the oil ring in applied position on a piston 21, the latter being formed with an annular groove or ring land 22 to receive the ring. The upper surface 23 of the ring land is the surface against which the ring bears when the piston makes its down stroke. It will be noted that the base 17 is of less diameter than the body of the ring and has an unbroken contour. This not only increases the strength and efficiency of the ring but also brings the lower outside edge of the base of the ring inwardly from the lower outer edge 24 of the ring land so that it does not come in contact with said edge, eliminating any tendency to round off said edge, due to wear and facilitating replacement service.

It is preferred to locate the peak of the undercut 13 and the slots 16 below the center of the ring since experience has demonstrated that such location permits the oil to be forced closer to the bottom of the ring groove and gives the oil scraped from the cylinder wall a better chance to escape inwardly through the slots 16. By locating the slots 16 below the center of the inside face of the ring, the upper portion of the ring remains unweakened or unbroken in cross-section. This is important, due to the fact that it insures against distortion and provide efficient seating in the ring land.

A series of compression rings 25 and 26 are also shown in conjunction with the ring.

Briefly stated, the ring operates as follows:

On the down stroke of the piston, the lower outside scraping edge 14 comes in contact with the oil which is thrown up onto the cylinder wall by splash or other means and pressure is thus created in the pocket 15 having two components, namely, a radially outward or spreading action and a vertical thrust against the upper surface of the ring land.

The first component prevents the oil from passing between the outside face of the ring and the cylinder wall, and the second component urges the ring against the upper surface of the ring land effecting a seal at this point. The entrapped oil is caused to pass through the slots 16 and thence to the interior of the piston through ports 27 formed in the piston wall, any suitable number of which may be provided, the oil returning to the crank case by way of the inside of the piston, leaving enough on the piston wall to afford ample lubrication.

The entrapped oil also flows circumferentially and equalizes itself on the interior of the ring through the medium of the circumferential slots or equalizing groove 19, thereby avoiding unequal pressure on the ring and piston.

The continuous and unbroken base on the ring materially increases the strength of the ring as a whole due to the fact that it reinforces the slotted and grooved cross section. It will also be noted that the inner surfaces of the upper main body portion and the lower base portion provide a relatively large bearing area with respect to the adjacent wall of the ring land.

In the event that an expanding spring is used with the ring, the communicating grooves 19 eliminate any ill effects which may result from misplacement of the spring. It is of advantage to use a spring of less diameter than the diameter of the grooves 19 so as not to interfere with the free flow of oil through these grooves and to also anchor the spring and ring against relative displacement.

It will be understood that no attempt has been made to enumerate all of the advantages resulting from the particular construction of the improved ring, and also that certain limited changes in construction and design may be adopted to bring about such advantages without departing from the spirit and scope of the invention as defined by the appended claims.

What is claimed is:

1. A piston ring comprising a split metal annulus formed with an upper main body portion and a lower continuous unbroken base portion of reduced diameter with respect to the main body portion and adapted to rest upon the base of a ring land, the body portion being undercut from its lower outer edge inwardly at an upward incline and thence from the peak of the incline inwardly and downwardly to the interior of the ring to provide a pocket for increasing the vertical thrust component of the oil pressure built up beneath the ring upon the down stroke of a piston to which the ring may be applied, lugs joining the base to the body portion at spaced points only leaving radial slots communicating the said pocket with the interior of the ring throughout the major part of the area between the body and base portions and permitting a free transfer of oil from the exterior to the interior of the ring, the lugs occupying only a relatively small portion of said area and having their inner faces channeled to provide communication between said radial slots around the entire interior area of the ring and equalize the pressure of oil forced inwardly through the slots by the undercut, the inner surfaces of the upper main body portion and the lower base portion providing a relatively large bearing area with respect to the adjacent wall of the ring land, and with respect to the channeled portions of the lugs.

2. A piston ring comprising a split metal annulus formed with an upper main body portion and a lower continuous unbroken base portion of reduced diameter with respect to the main body portion adapted to rest upon the base of a ring land, the body portion being undercut from its lower outer edge inwardly at an upward incline, lugs joining the base to the body portion at spaced points only leaving radial slots communicating the said undercut with the interior of the ring throughout the major part of the area between the body and base portions and permitting a free transfer of oil from the exterior to the interior of the ring, said lugs occupying only a relatively small portion of said area and having their inner faces channeled to provide communication between said radial slots around the entire area of the ring and equalize the pressure of oil forced inwardly through the slots, said lugs being of beveled contour starting at the inner surface of said base portion and sloping radially inwardly to the opposite ends of the lug channel to impose a minimum of resistance to circumferential flow of oil, the inner surfaces of the upper main body portion and the lower base portion providing a relatively large bearing area with respect to the adjacent wall of the ring land and with respect to the channeled portions of the lugs.

MILLARD F. THORN.